No. 788,793. PATENTED MAY 2, 1905.
J. RAINS.
MEAT TENDERER.
APPLICATION FILED JUNE 2, 1904.
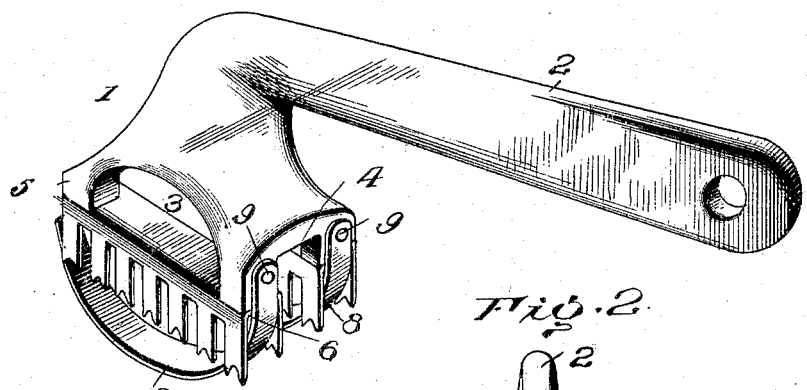
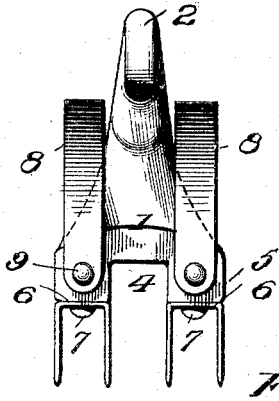
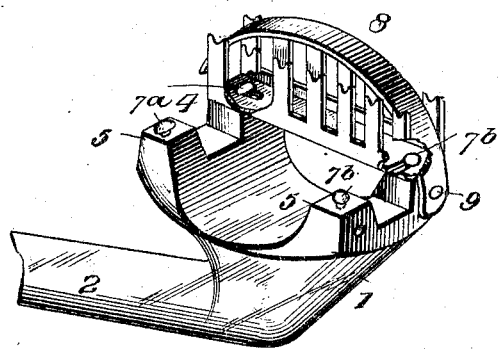
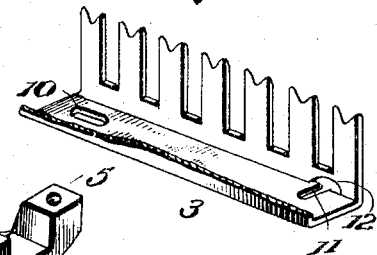
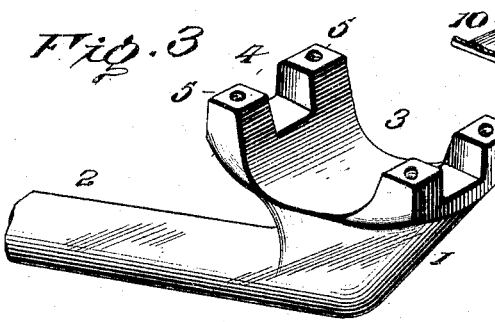
Inventor
J. Rains
By R. & A. B. Lacey, Attorneys
Witnesses No. 788,793. Patented May 2, 1905.

UNITED STATES PATENT OFFICE.

JACOB RAINS, OF RACINE, WISCONSIN.

MEAT-TENDERER.

SPECIFICATION forming part of Letters Patent No. 788,793, dated May 2, 1905.

Application filed June 2, 1904. Serial No. 210,871.

*To all whom it may concern:*

Be it known that I, JACOB RAINS, a citizen of the United States, residing at Racine, in the county of Racine and State of Wisconsin, have invented certain new and useful Improvements in Meat-Tenderers, of which the following is a specification.

This invention relates to the type of devices for severing the fibers, tissues, tendons, veins, and the like of meat to facilitate mastication and which embody in their structure an operating-head, cutters projected therefrom, and spring-clearers for detaching the meat from the cutters as the latter are withdrawn from the meat.

The present invention has for its object to enable the device to be easily and conveniently cleaned; and to this end the head is of peculiar construction, being provided with clearance-spaces to admit of the ready removal of any accumulation when through using the device, and the spring-clearers are arranged in such a manner as to be turned out of the way and occupy a small space when unobstructed access is desired to be had to the cutters for cleaning or other purpose.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a meat-tenderer embodying the invention. Fig. 2 is an end view thereof, showing the spring-clearers turned up out of the way. Fig. 3 is a detail perspective view of the head portion of the device stripped of the cutters and clearers. Fig. 4 is a detail perspective view of a modification having a cutter and the corresponding clearer removed. Fig. 5 is a perspective view of a modified form of cutter, a portion being broken away.

Corresponding and like parts are referred to in the following description and indicated in all the views of the drawings by the same reference characters.

The body of the implement comprises head 1 and handle 2, the latter projecting from one side of the head. The parts 1 and 2 are preferably of integral formation and cast metal. A space 3 is formed transversely of the head in the face opposite to the cutters and enables the ready removal of any accumulated matter that may collect during the operation of the device. A longitudinal space 4 intersects the transverse space 3 and is for a like purpose. The intersecting clearance-spaces 3 and 4 result in the provision of a series of lugs 5, which are located at the corners of the head and have the cutters attached thereto. The head 1 and handle 2 are of such weight as to enable the implement to be effectively used in the operation of mincing or rendering meat tender by severing the tissues and fibers thereof.

The cutters 6 are of U form, the side members being provided with a plurality of teeth, which penetrate the meat and render the same tender during the operation of the implement in the accustomed manner. The cutters 6 are disposed in parallel relation, preferably lengthwise of the head, and are attached near their ends to corresponding lugs by suitable fastenings 7. As shown most clearly in Fig. 1, the major portion of each cutter is exposed, and hence is readily accessible for the purpose of cleaning. As shown, the implement comprises two cutters; but it is to be understood that the number may be varied according to the capacity of the implement. A spring-clearer 8 is provided for each cutter and is adapted to operate in the space formed between the side teeth thereof. Each clearer 8 is pivotally connected at one end to a side of the head 1, as shown at 9, so as to be turned to occupy a position in the rear of the head and alongside of the handle 2, as indicated most clearly in Fig. 2. The clearers 8 are of bow form and are free at one end and normally project beyond the teeth of the cutters, as indicated most clearly in Fig. 1.

When using the device, the clearers are pressed into the space formed between corresponding teeth of a cutter by coming in contact with the meat, and upon withdrawing the teeth from the meat the clearers spring outward and expel or force the meat from between the teeth of the cutters and prevent it from following or sticking to the same. When the clearers are turned so as to occupy a position in the rear of the head and alongside of the handle, the cutters are unobstructed and may be easily cleaned, the clearers being entirely out of the way and not interfering with the cleaning of the cutters. When the cutters are turned into the position substantially as shown in Fig. 2, the implement may be used for chopping vegetables or other food not requiring the use of the clearers.

In the modification shown in Figs. 4 and 5 the lugs 5 are provided with headed studs 7ª and 7ᵇ, and each cutter has its base portion provided near one end with an oblong opening 10 and near the opposite end with a slot 11, which extends through an edge of the base and communicates with an enlarged opening 12, formed in a side portion of the cutter. The oblong opening 10 extends lengthwise of the cutter and is adapted to receive the headed stud 7ª, whereas the slot 11 is adapted to receive the headed stud 7ᵇ, the head of said stud passing through the opening 12 when entering or leaving the slot 11. When placing the cutter in position, it is arranged about at a right angle to the plane of the handle 2 to bring the opening 10 in register with the head of the stud 7ª, and after the head of said stud has been passed through the opening 10 the cutter is turned to cause the head of the stud to sit crosswise of the opening 10, so as to retain the cutter in place. As the cutter swings to position upon the head 1 the head of the stud 7ᵇ passes through the opening 12 and the shank of the stud enters the slot 11, portions of the head of said stud 7ᵇ overlapping corresponding parts of the base, so as to retain the cutter in place. The clearer 8 is caused to assume the position shown in Fig. 4, so as to form a lock for the cutter and prevent movement thereof to cause the stud 7ᵇ to leave the slot 11.

Having thus described the invention, what is claimed as new is—

1. The herein-described meat-tenderer comprising a head having an operating-handle and provided in its face with intersecting spaces to form spaced corner-lugs, cutters of approximately U form attached to said lugs, and spring-clearers of bow form arranged to operate in the space formed between the teeth of the respective cutters and pivotally connected at one end to a side of the head so as to be turned to occupy a position in the rear of the head and alongside the handle thereof, substantially as set forth.

2. In an implement of the class described, the combination of a head, studs projecting therefrom, a cutter provided near one end with an oblong opening and near its opposite end with a slot for coöperation with the respective studs, the interlocking being effected by pivotal movement of the cutter, and a clearer normally interlocking with the cutter to retain the same in proper position.

In testimony whereof I affix my signature in presence of two witnesses.

JACOB RAINS. [L. S.]

Witnesses:
PETER NELSON,
CHARLES HELDING.